United States Patent
Blaner et al.

(10) Patent No.: US 9,727,483 B2
(45) Date of Patent: *Aug. 8, 2017

(54) TRACKING MEMORY ACCESSES WHEN INVALIDATING EFFECTIVE ADDRESS TO REAL ADDRESS TRANSLATIONS

(71) Applicant: International Business Machines Corporation, Armonk, NY (US)

(72) Inventors: Bartholomew Blaner, Underhill Center, VT (US); Jay G. Heaslip, Williston, VT (US); Kenneth A. Lauricella, Colchester, VT (US); Jeffrey A. Stuecheli, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/727,075

(22) Filed: Jun. 1, 2015

(65) Prior Publication Data

US 2016/0179698 A1     Jun. 23, 2016

Related U.S. Application Data

(63) Continuation of application No. 14/576,274, filed on Dec. 19, 2014.

(51) Int. Cl.
*G06F 12/00* (2006.01)
*G06F 12/1009* (2016.01)

(52) U.S. Cl.
CPC .. *G06F 12/1009* (2013.01); *G06F 2212/1016* (2013.01); *G06F 2212/65* (2013.01); *G06F 2212/657* (2013.01)

(58) Field of Classification Search
CPC ............. G06F 12/1027; G06F 12/1036; G06F 12/1009
See application file for complete search history.

(56) References Cited

U.S. PATENT DOCUMENTS 5,906,001 A *   5/1999   Wu ..................... G06F 12/1036
                                              711/141
6,886,085 B1 *  4/2005   Shuf .................. G06F 9/30047
                                              711/143

(Continued)

OTHER PUBLICATIONS

Blaner et al., "Tracking Memory Accesses When Invalidating Effective Address to Real Address Translations," U.S. Appl. No. 14/576,274, filed Dec. 19, 2014.

(Continued)

*Primary Examiner* — David X Yi
*Assistant Examiner* — Arvind Talukdar
(74) *Attorney, Agent, or Firm* — Mark G. Edwards (57) ABSTRACT

According to embodiments of the present disclosure, a method for invalidating an address translation entry in an effective address to real address translation table (ERAT) for a computer memory can include receiving a first invalidation request. According to some embodiments, the method may also include determining that a first entry in the ERAT corresponds with the first invalidation request, wherein the ERAT has a plurality of entries, each entry in the plurality of entries having an indicator. In particular embodiments, the method may then determine that a first indicator associated with the first entry indicates that the first entry is not being used by any of a plurality of memory access entities (MAE), wherein a first MAE can concurrently use a same entry as a second MAE. The first entry may then be invalidated in response to determining that the first entry is not being used.

7 Claims, 4 Drawing Sheets

(56) References Cited

U.S. PATENT DOCUMENTS

| | | | |
|---|---|---|---|
| 7,099,999 B2 | 8/2006 | Luick | |
| 8,412,911 B2 | 4/2013 | Grohoski et al. | |
| 2004/0215897 A1* | 10/2004 | Arimilli | G06F 12/1027 |
| | | | 711/144 |
| 2007/0250666 A1* | 10/2007 | Sartorius | G06F 12/0891 |
| | | | 711/133 |
| 2010/0235586 A1* | 9/2010 | Gonion | G06F 12/0831 |
| | | | 711/144 |
| 2010/0332786 A1* | 12/2010 | Grohoski | G06F 9/3851 |
| | | | 711/207 |
| 2011/0252200 A1* | 10/2011 | Hendry | G06F 12/0831 |
| | | | 711/121 |
| 2014/0181454 A1* | 6/2014 | Manula | G06F 12/0223 |
| | | | 711/170 |

OTHER PUBLICATIONS

List of IBM Patents or Patent Applications Treated as Related.

Intel, "Intel 64 and IA-32 Architectures Software Developer's Manual," Intel, Chapters 2-4, Jun. 2016, Order No. 325384-059US, 92 pages, Copyright 1997-2016, Intel Corporation.

Peng et al., "The PowerPC Architecture: 64-Bit Power with 32-Bit Compatibility," Compcon '95, Technologies for the Information Superhighway, Digest of Papers, 1995, pp. 300-307, San Francisco, CA DOI: 10.1109/CMPCON.1995.512400.

Motorola, "PowerPC; Advance Information; PowerPC 620 RISC Microprocessor Technical Summary", Rev. 1, Jul. 1996, 33 pages, © Motorola Inc., 1996.

IBM, "PowerPC Operating Environment Architecture" Book III Version 2.02, Jan. 28, 2005, 135 pages, Copyright International Business Machines Corporation, 1994, 2003, Nov. 23, 2016.

* cited by examiner

TRACKING MEMORY ACCESSES WHEN INVALIDATING EFFECTIVE ADDRESS TO REAL ADDRESS TRANSLATIONS

BACKGROUND

The present disclosure relates to processor systems, and more specifically, to a system and method for invalidating an effective address to real address translation in a processor capable of performing multiple parallel memory accesses.

Consistent with the drive to improve processor performance, computer architects may incorporate processor subsystems having multiple parallel execution units into the design of central processing units (CPU). The term "execution units" refer generally to hardware units inside a processor, separate from the CPU cores that may be optimized to perform a dedicated set of calculations and operations on the behalf of a thread or process. Execution units may include data accelerators, memory management units, and dynamic memory access (DMA) controllers. The execution units improve the overall performance of a computing system by offloading from the CPU computationally intensive, yet commonly executed tasks, such as data compression, encryption, and signal processing. In the course of carrying out these tasks, execution units may issue memory access requests for loading source data for processing, or storing target (or output) data. The CPU's performance may be optimized by ensuring that a constant stream of data is fed to, and retrieved from, the execution units. This goal may be achieved by incorporating multiple parallel memory access entities (MAEs) in processor subsystems having execution units. An execution unit such as a DMA controller may use the MAEs to help mask memory access and bus latencies by prefetching source data and performing buffered writes of target data for multiple execution units in parallel.

SUMMARY

According to embodiments of the present disclosure, a method for invalidating an address translation entry in an effective address to real address translation table (ERAT) for a computer memory can include receiving a first invalidation request. According to some embodiments, the method may also include determining that a first entry in the ERAT corresponds with the first invalidation request, wherein the ERAT has a plurality of entries, each entry in the plurality of entries having an indicator. In particular embodiments, the method may then determine that a first indicator associated with the first entry indicates that the first entry is not being used by any of a plurality of memory access entities (MAE), wherein a first MAE can concurrently use a same entry as a second MAE. The first entry may then be invalidated in response to determining that the first entry is not being used.

According to embodiments of the present disclosure, a processor is provided for invalidating an address translation entry in an effective address to real address translation table.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to processor systems, more particular aspects relate to a system and method for invalidating an effective address to real address translation in a processor system capable of performing multiple parallel memory accesses. While the present disclosure is not necessarily limited to such applications, various aspects of the disclosure may be appreciated through a discussion of various examples using this context.

The execution units described previously may issue memory access requests using effective (or virtual) addresses. Before a parallel memory access entity can service a memory access request on the behalf of an execution unity, the effective address must be translated into a real (or physical) address. Translations of an effective address to a real address may involve combinations of logical computations and table lookups. To offset the computational and memory access costs associated with these operations, a subset of recently translated addresses can be cached in lookup tables, including translation lookaside buffers (TLBs), segment lookaside buffers (SLBs), and effective address to real address translation tables (ERATs). An event such as a context switch or a paging operation may require cached addresses to be invalidated (e.g., purging the translations from the lookup tables). Invalidations may increase the time and computational resources needed to process memory access requests that require the invalidated translations because the ousted pages may have to be brought back into memory, and new translations may need to be generated. Consequently, the manner in which the invalidations are serviced in processor systems capable of multiple parallel memory accesses may impact processor performance.

In a processor subsystem where multiple parallel memory access entities (MAEs) service memory access request on the behalf of execution units, all MAEs may have concurrent memory operations underway at a given time during the processor's operation. For example, a processor subsystem having 16 read and 16 write MAEs can have up to 32 memory access operations in flight at the same time. An effective address to real address translation table (ERAT) entry targeted for invalidation by an address translation invalidation request (herein after "invalidation request") may be in use by any one, or all, of the pending memory access operations. Allowing the invalidation request to complete can include swapping out one or more pages of memory containing data needed to service the pending operations. The operations may then have to be aborted, or at least stalled until the targeted data is paged back in to active memory. This may interrupt the flow of data to the execution units, with a consequential decrease in processor performance.

Embodiments of the present disclosure are based on the recognition that processor performance can be improved by stalling or delaying an invalidation request until all outstanding memory access operations using the targeted translation have been serviced (completed). This may be accomplished by, first, storing subsets of effective addresses, along with process identifiers, in a memory associated with each MAE. An incoming invalidation request, including a process identifier and the effective address of the targeted translation, can then be broadcast to each MAE. The MAEs can compare the information in the request to the corresponding information stored in their associated memories and if a match is found, the invalidation may be delayed until the matching MAE(s) have completed their memory access. This approach may increases the chip cost of each MAE because additional real estate on the die may have to be allocated to accommodate the added storage requirements and comparing logic; but for this approach, the MAEs may not need to store local copies of effective addresses or process identifiers. Computer architects can reduce the memory requirement by designing the MAEs to store only a portion of the effective addresses and identifiers. The MAEs may, for example, store only a subset of the total number of bits required to represent a complete effective address or process identifier. This architectural fix, however, may lead to over indication of a match on an invalidation request because a given request may match all translations whose effective address and process identifiers differ in only the omitted bits. Consequently, invalidation requests may have to wait, unnecessarily, for an erroneously matched MAE to finish its memory access.

A second artifact of the above approach to stalling invalidation request is that the request may be broadcast over the shared processor bus to each MAE. Broadcasting the request to each MAE for comparison creates added traffic to a bus that may already be operating at peak load. The added communication requirements that may be needed to support the broadcast network may become prohibitive for processor subsystems that support a large number of parallel memory access MAEs (at the time of this writing, designs for systems having up to 256 outstanding memory accesses were not unheard of).

Embodiments of the present invention are directed towards a method and system for tracking address translation usage in an effective address to real address translation table, and toward invalidating a translation in response to a translation invalidation request. According to various embodiments, an ERAT management unit (EMU) can keep a record of each use of an ERAT entry in a memory access. The record can also be updated each time the memory access for which the translation was used finishes. The EMU may receive a translation invalidation request on the behalf of the ERAT. The EMU can use the logged information to either signal completion of the invalidation request (because the targeted entry is not being used in a memory access), or to stall the invalidation (because the entry is being used in one or more outstanding memory access).

According to various embodiments, the method of tracking address translation usage in an ERAT and invalidating translations may include receiving an address translation invalidation request and determining that an entry in the ERAT corresponds with the request. The EMU may receive the request from a coprocessor, or another controller connected to the same processor bus as the EMU. A memory management unit (MMU), for example, may issue the request in response to an event, such as a TLB miss, requiring one or more pages to be swapped out of memory. The request may include the effective address of the targeted translation, and a process (or thread) identifier. Inside the EMU, each entry in the ERAT may have translation information stored in a number of fields. The information may include an effective address, a corresponding real address translation of the effective address, and an identifier of the process or thread that manifested the translation. According to some embodiments, the EMU (or ERAT) may determine which ERAT entry corresponds with the invalidation request by searching the ERAT for an entry having a matching effective address and process identifier. If a match is not found, the MMU can be allowed to service the invalidation unencumbered.

According to various embodiments, an indicator may be associated with each ERAT entry. The method may then further include determining, based on the state of the indicator, whether the ERAT entry targeted for invalidation is currently being used in a memory access (e.g., are there memory access operations using the entry's translation pending in any of the MAEs?). In some embodiments, the indicator may be a counter having at least the minimum bit-width needed to track the total number of MAEs that can concurrently use a translation. Theoretically, this requirement may demand that each counter have enough bits to count up to the total MAEs in a subsystem because all MAEs may concurrently use the same translation. In these embodiments, determining whether an entry in use may include checking whether the value of the counter indicates that the entry is being used. For example, if the counter associated with an entry is initially set to zero, determining that the entry is not being used may include determining that the counter value is zero. Similarly, determining that the entry is in use may include determining that the counter value is not zero. In some embodiments, the counters may be preloaded with non-zero initial values, in which case, determining whether an entry is being used may include checking whether the counter value is at the reset value.

In some embodiments the indicator associated with an ERAT entry may be a single bit in a bit-field (or vector) having a bit for each ERAT entry. In this embodiment, the step of determining whether an entry in use may include checking whether the corresponding bit in the bit-field is set or cleared. For example, if all bits in the bit-field are initially cleared, determining that the entry is not in use may include verifying that the corresponding bit is cleared. Similarly, determining that the entry is in use may include verifying that the corresponding bit is set.

According to various embodiments, the method may also include using a tracking array to track the ERAT entries in use by the MAEs, and using the contents of the array to update the indicators. Each MAE may be associated with one element of the tracking array (e.g., each MAE may use one element of the tracking array to track the ERAT entry it is currently using). Furthermore, each element of the tracking array can store a reference to an ERAT entry. The reference can be used to update the indicator associated with the ERAT entry pointed to by the reference (e.g., the entry being used that the MAE associated with the array element storing the reference). In embodiments where the ERAT entries' indicators are counters, each tracking array element may be a register (or similar memory unit), and the reference may be the index of an entry in the ERAT table.

In embodiments where the ERAT entries' indicators are bits in a bit-field, each tracking array element may include a latch and an associated valid bit, and the reference may be an index of an entry in the ERAT table. Each latch may have an associated decoder. The decoder may be gated by the valid bit (i.e., the valid bit may enable or disable the operation of the decoder). The decoder decodes the latched index to produce an "InUse" vector where each bit of the vector corresponds to an ERAT entry. If the latch's valid bit is set, the InUse vector bit associated with the ERAT entry whose index is latched may be the only bit set; all other bits may be cleared. If the valid bit is cleared, all bits in the InUse vector may be cleared. The InUse vectors for all tracking array elements can then be logically combined (e.g., the corresponding bits of each vector can be combined using a bitwise "OR" operation) to produce a composite InUse vector (the ERAT entries' indicator bit-field). In some embodiments, the valid bit associated with a given latch may be set to indicate that the associated MAE is currently using the ERAT entry referenced by the latched index. The valid bit may cleared to indicate that the entry is not in use by the associated MAE.

According to various embodiments, the method also include receiving a request to access memory, and updating the indicator associated with an ERAT entry corresponding with the request. An execution unit, such as a DMA controller may send the memory access request to the ERAT for translation. The request may include the effective address of the target memory, and an identifier of a MAE that will perform the memory access. The ERAT may service the request by finding an ERAT entry having an effective address and process identifier that matches the corresponding information in the request. Next, the matching entry's index may be stored in the tracking array element associated with MAE selected to perform the memory access, using the identifier supplied in the request to determine the correct tracking array element. The indicator can then be updated to reflect that the translation stored in the matching entry is in use. According to embodiments where the ERAT entries' indicators are counters, the updating the indicator may include incrementing the counter associated with the matching ERAT entry. In some embodiments where the ERAT entries' indicators are bits in a bit-field, updating the indicator may include setting the valid bit associated with the selected tracking array element.

According to various embodiments, the method may further include receiving a notification that a MAE has finished its memory access, and updating the indicator associated with the ERAT entry that translated the address used in the memory access. In some embodiments, the notification may be available in a message sent to the initiating execution unit to alert it that the MAE has completed a requested memory access. Updating the entry may first include obtaining the identifier of the MAE that issued the notification. Next, the identifier may be used to identify the tracking array element associated with the identified MAE. According to embodiments where the ERAT entries' indicators are counters, the update may be completed by using the index stored in identified the tracking array element to select and decrement the counter associated with the ERAT entry that provided the address translation to the identified MAE. In embodiments where the ERAT entries' indicators are bits in a bit-field, the update may be completed by clearing the valid bit associated with the identified tracking array element.

In some embodiments, a memory access request may bypass address translation in the ERAT. These requests may already includes a real addresses. According to these embodiments, the ERAT entry indicators described herein are not updated for these memory accesses.

In particular embodiments, a single invalidation request may target a plurality of ERAT entries, including all entries in the ERAT. Such a request may include multiple target addresses, or a directive to invalidate all ERAT entries. In these embodiments, the method described herein will stall the invalidation request until the indicator associated with each of the plurality of ERAT entries targeted for invalidation indicate that the entries are not being used in any memory access.

Figure 1:
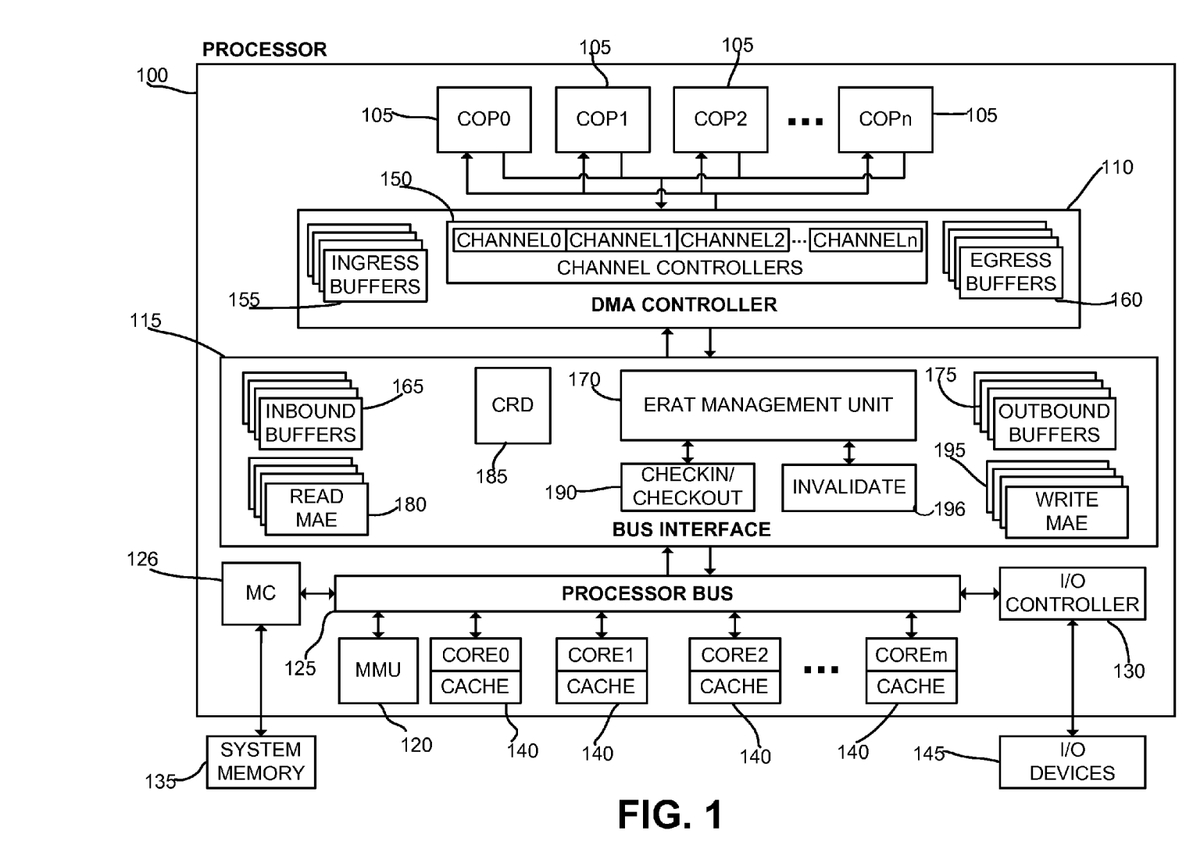
FIG. 1 depicts a processor having execution units, parallel memory access entities, and ERAT management unit, according to various embodiments.

Turning now to the figures, FIG. 1 depicts a processor 100 having executions units, parallel memory access entities, and an ERAT management unit, consistent with various embodiments. The processor 100 may have multiple CPU cores (0-m) and associated cache 140 connected to a processor bus 125. The CPU cores may be capable of executing multiple computer instructions in parallel on the behalf of various software processes. The I/O controller 130 may provide an interface between the processor's 100 subsystems and external I/O devices 145 via the processor bus 125. The memory management unit (hereinafter "MMU") 120 may be coupled to the processor bus 125 and can provide address translation and translation invalidation functions to similarly connected subsystems. The memory controller (hereinafter "MC") 126 may be coupled to both the processor bus 125 and system memory 135. The MC 126 may provide an interface between similarly connected subsystems and off chip memory 135, including, for example, servicing memory load and store requests.

The microprocessor 100 may have multiple coprocessors (0-n) (hereinafter "COP") 105. The COPs 105 are execution units that help improve processor efficiency by carrying out computationally intensive, yet commonly executed, work tasks on behalf of the processor 100 or CPU cores 140. Each COP 105 can issue read and write memory access requests in the course of executing these tasks. The DMA controller 110 may service these memory access requests on the behalf of the COPs 105.

The DMA controller 110 may have ingress 155 and egress 160 buffers which temporarily store source data destined for the COPs 105 or target data produced by the COPs, respectively. The DMA controller 110 can also have channel controllers 150 that facilitate communications with the COPs 105. The DMA controller 110 may prefetch source data for COP 105 operations that are waiting to be executed by sending read requests to one or more read parallel memory access entities (hereinafter "read MAE") 180. Similarly, the DMA controller 110 may initiate memory write operations on behalf of the COPs by forwarding write requests to one or more write parallel memory access entities (hereinafter "write MAE") 195, and transferring the target data to the write MAE's outbound buffer 175. The ERAT, through the ERAT Management Unit 170, may translate and replace effective addresses in the memory access requests before forwarding them to the respective MAEs. The read MAEs' 180 inbound buffer 165 may temporarily store the data read from memory. The DMA controller 110 may subsequently transfer the data from the read MAEs' 180 inbound buffer 165 to DMA's ingress buffers 155.

The bus interface 115 subsystem serves as a bridge connecting the DMA controller 110 and COPs 105 to the processor bus 125, and may facilitate the flow of bus traffic possibly across different clock domains. The Checkin/Checkout request queue 190 may help service address translation misses, and ERAT updates. The invalidation 196 block may facilitate the servicing of invalidation requests. The COP Request Dispatch (CRD) block 185, fetches COP 105 request structures from memory on the behalf of the DMA controller 110 for the purpose of initiating (dispatching) operations on COPs 105.

Figure 2:
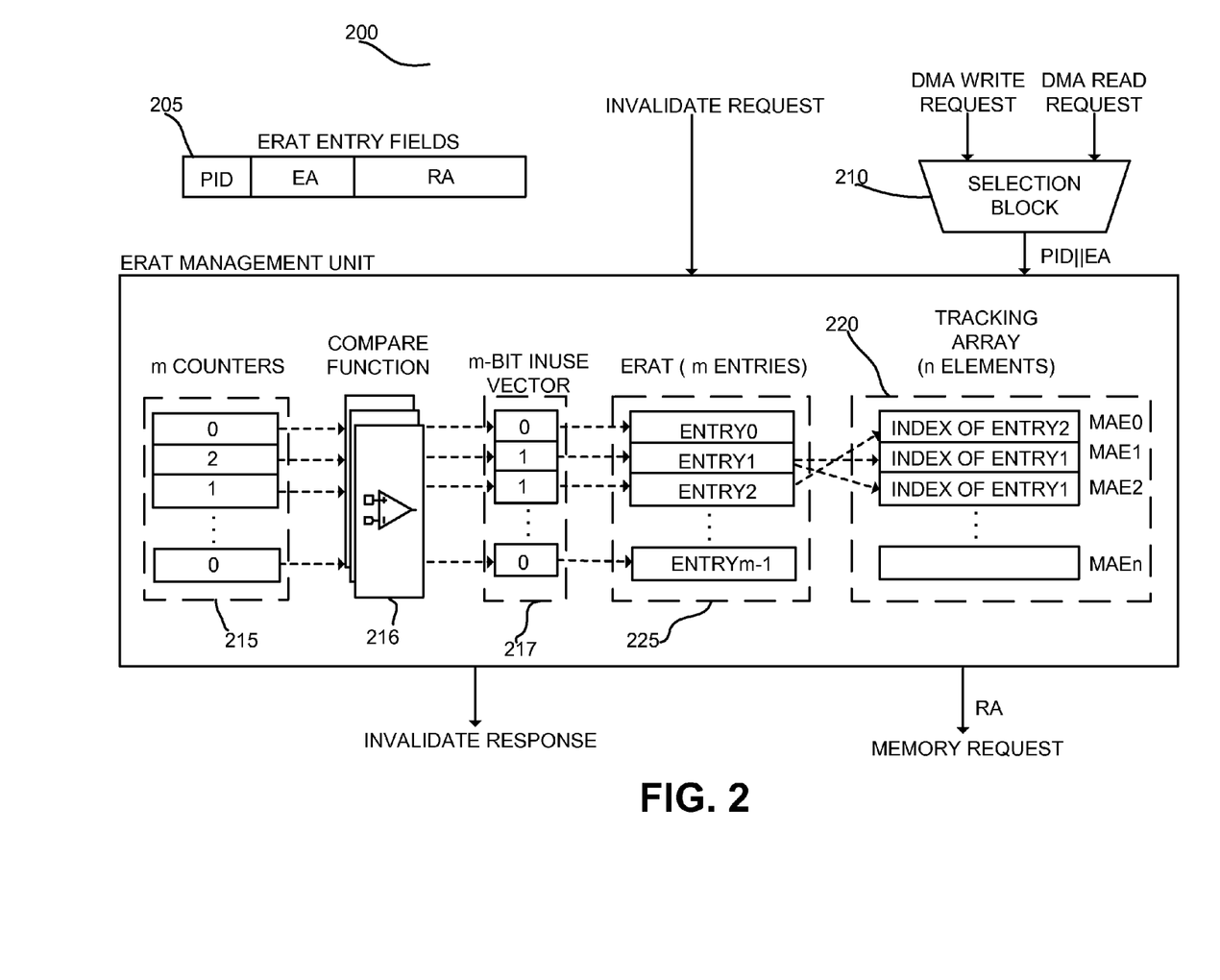
FIG. 2 depicts a detailed view of a counter-based ERAT management unit, according to various embodiments.

FIG. 2 depicts a detailed view of an ERAT management unit, consistent with various embodiments. Block 200 in FIG. 2 corresponds with block 170 in FIG. 1 in various embodiments in which an indicator associated with an ERAT entry is counter. The EMU 200 may include a bank of counters 215, comparison logic circuits 216, InUse vector 217, a tracking array 220, and an ERAT 225. The bank of counters 215 may include one counter for each entry in the ERAT 225. Although they are illustrated separately in block 200, in some embodiments, the bank of counters 215 may be integrated with the ERAT 225 such that one field of an ERAT entry may be the entry's associated counter. Each counter can be constructed to have the minimum bit-width needed to track the total number of MAEs that can concurrently use the translation in an ERAT entry. For example, processor systems having 32 MAEs may be constructed with counters that are five bits wide. The EMU 200 may associate one element of the tracking array 220 with each MAE in a processor's subsystem. Each element of the tracking array 220 may store an index of the ERAT entry being used by the associated MAE. For example, in FIG. 2, the index of ERAT entry "ENTRY1" is stored in the tracking array 220 element associated with parallel memory access entity MAE1 and MAE2 to indicate that both MAEs are using "ENTRY1." In some embodiments, the tracking array may be realized as a bank of registers. Each register may be constructed to have the minimum bit-width needed to uniquely store the index of each ERAT entry.

According to various embodiments, each counter 215 may have an associated compare function 216. In some embodiments, the compare function 216 may be a two input comparator having the same bit-width as the associated counter 215. The compare function 216 compares the value of the associated counter against a datum to produce a one-bit output indicating whether the ERAT entry associated with the counter 215 is in use. For example, in some embodiments where the datum is zero and the associated counter 215 value is non-zero, the compare function's 216 output bit may be set to indicate that the ERAT entry associated with the counter is in use. Similarly, in some embodiments where the datum is zero and the associated counter 215 value is zero, the compare function's 216 output bit may be cleared to indicate that the ERAT entry associated with the counter is not in use. In some embodiments, the output of each counter function 216 may be latched to produce an InUse vector 217. In other embodiments, the InUse vector 217 may be the unlatched outputs of the compare function 216.

The ERAT apparatus 200 may take a plurality of inputs, including invalidation requests, DMA write and read requests, and ERAT entry updates. Selection block 210 indicates that memory access operations, such as DMA read and write requests, may be processed serially and the request may include a process identifier (PID) and an effective address (EA). The ERAT apparatus 200 may provide outputs, including a response to an invalidation request, and a real address translation for use in a memory access. Block 205 illustrates an ERAT entry that may include multiple fields, including process identifier (PID), effective address (EA), and real address (RA) fields. The illustrated inputs, outputs, and ERAT fields are only a subset of the inputs, outputs, and ERAT fields that may be included in the EMU 200. The depicted inputs, outputs and ERAT fields are provided to facilitate the disclosure of the present invention; other combinations are possible.

Figure 3:
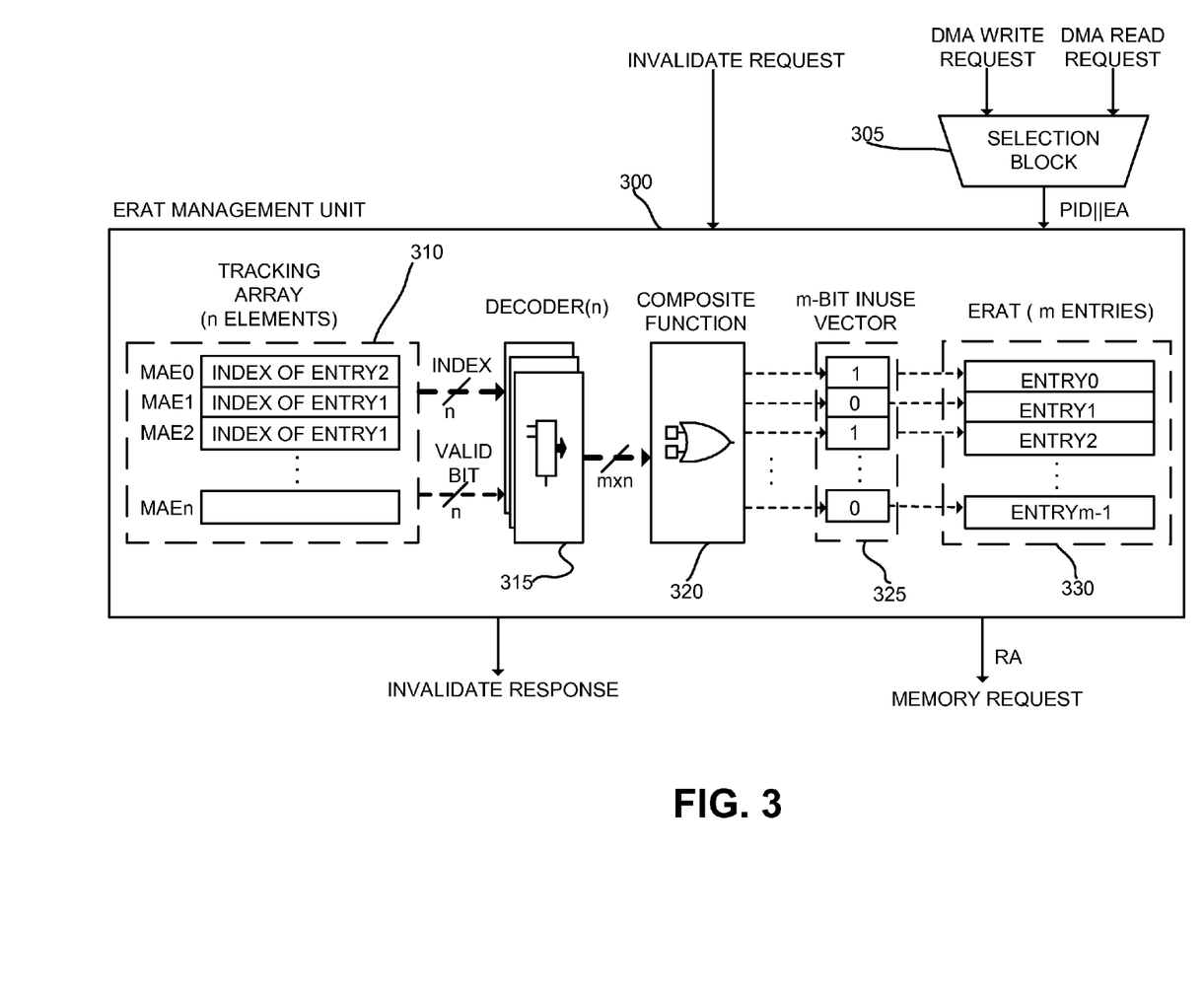
FIG. 3 depicts a detailed view of bit-field based ERAT management apparatus, according to various embodiments.

FIG. 3 depicts a detailed view of a bit-field ERAT management unit (EMU), consistent with various embodiments. Block 300 corresponds with block 170 in FIG. 1 in various embodiments in which an indicator associated with an ERAT entry is a single bit in a bit-field. The EMU 300 may include a tracking array 310, decoders 315, a composite logic function 320, composite InUse vector 325, and an ERAT 330. Block 305 and ERAT 330 are analogous to, and serve the same purpose as, block 210 and ERAT 220 in FIG. 2. Similarly, the discussion of the EMU's 200 inputs and outputs in FIG. 2 apply to the inputs and outputs of the EMU's 300 in FIG. 3.

The EMU 300 may associate one tracking array 310 element with each MAE. Each tracking array 310 element may store an index of the ERAT 225 entry in use by the associated MAE. In some embodiments, the tracking array may be realized as an array of latches, with each latch having a valid bit. Each latch may be constructed to have the minimum bit-width needed to uniquely store the index of an ERAT 225 entry, plus one additional bit for the valid bit. Each tracking array element may have one associated decoder 315. The decoders 315 may have an input bit-width equal to the bit-width of a tracking array 310 latch, and an output bit-width equal to the number of entries in ERAT 330. For example, for a processor subsystem having 32 MAEs and a 16 entry ERAT, a decoder 315 may have a 6-bit input (5 data or index bits, plus one valid bit) and a 16 bit output. The input to a decoder 315 may be the index and valid bit latched in the tracking array 310 element associated with the decoder. If the valid bit for a given decoder 315 is set, the decoder's output may be an InUse vector having only one bit set.

Composite function 320 may be a bitwise logic function which accepts each of the InUse vectors produced by the decoders 315 as input, and logically combines respective bit positions in each vector to produce a composite InUse vector 325. According to various embodiments, the function may, for example, bitwise "OR" the first bit of each InUse vector (i.e., use the first bit of each InUse vector as an input to an "OR" gate) to produce the first bit of the composite InUse vector 325. The process can be repeated for each bit in the InUse vectors. In some embodiments, the output of the composite function 320 may be latched to produce the composite InUse vector 325. In other embodiments, the composite InUse vector 325 may be the unlatched outputs of the composite function 320.

Figure 4:
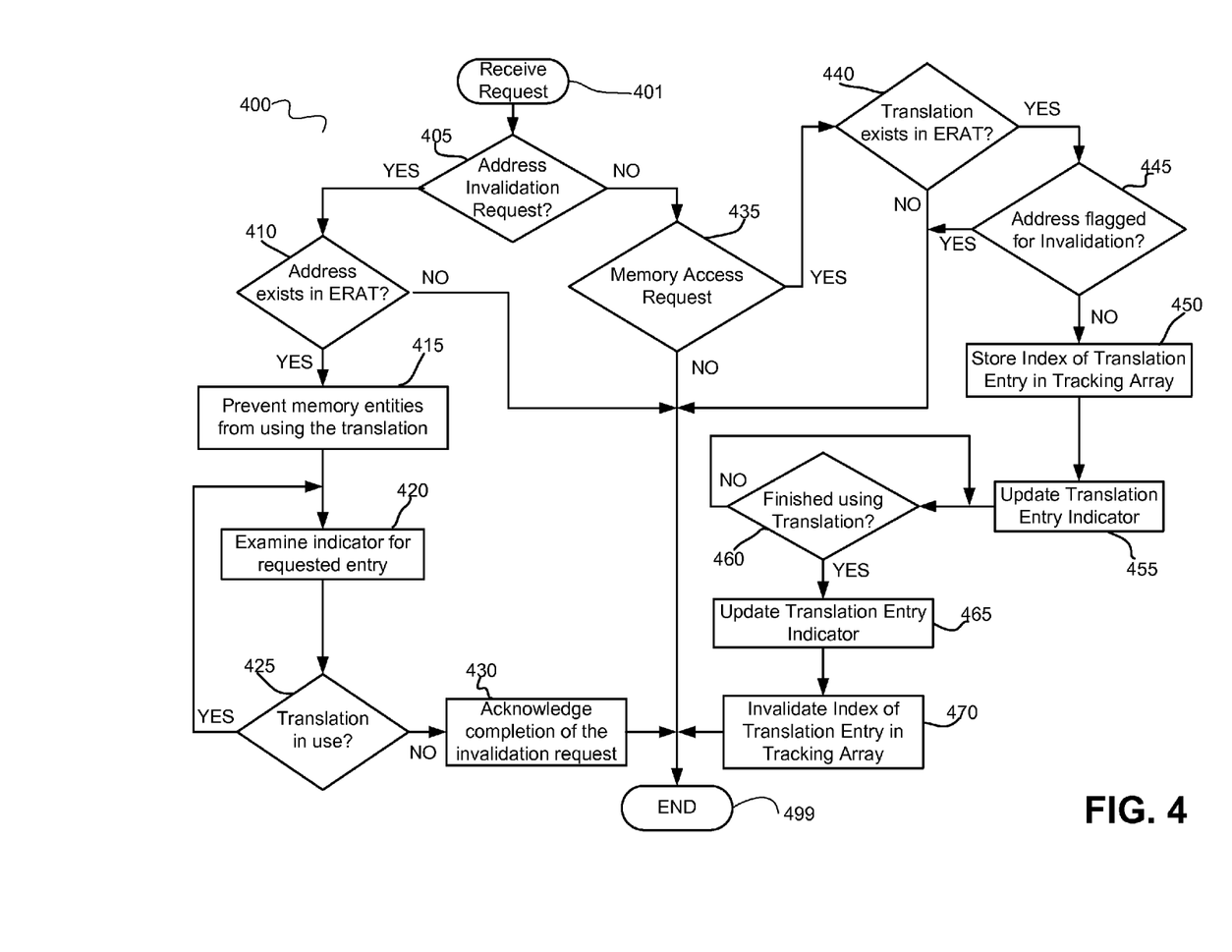
FIG. 4 depicts a flow chart of a method for tracking address translation usage in an ERAT and invalidating a translation in response to a translation invalidation request, according to various embodiments.

FIG. 4 depicts a flow chart of a method 400 for tracking address translation usage in an ERAT and invalidating a translation in response to a translation invalidation request, consistent with various embodiments. The method begins with a request received at block 401. The request may be a memory access request received from an execution unit (or COP), or it may be an invalidation request issued by a MMU. The method may proceed by determining whether or not a request is for a translation invalidation, as indicated in block 405. If the request is not an invalidation request, the method proceeds to block 435, while the method proceeds to block 410 when the request is an invalidation request.

When the received request is an invalidation request, the next step in the method may be to determine whether the address targeted for invalidation exists in the ERAT, consistent with block 410. The determination may include comparing the process identifier and effective address fields in the invalidation request against the corresponding fields of each entry in the ERAT. In some embodiments where the invalidation request is targeted at a plurality of addresses in the ERAT, a match may be indicated for each of the targeted ERAT entries. If a matching ERAT entry is found, the method may prevent the translation from being used in any future memory access requests, consistent with block 415. Subsequently, the ERAT management unit may examine the indicator associated with the matching entry, as indicated in block 420, and determine whether the translation is currently in use by a MAE, as indicated in block 425. When the translation is in use, the next step in the method may be to repeat the examination and determination process until the matching entry's indicator indicates that the translation is no longer in use. Once the determination is made that the translation is not being used, the method may proceed by completing the invalidation request as indicated in block 430. Allowing the invalidation to complete can include, marking the translation as invalid in the ERAT, and signaling to the MMU that the translation was invalidated. The method can then end, as indicated in block 499.

When the request received in block 401 is not an invalidation request, the method can proceed by determining whether the received request is a memory access request, as indicated in block 435. When the method is not a memory access request, the method ends by proceeding to block 499. However, when the request is a memory access request, the method may then continue on by determining whether a matching translation exists in the ERAT, consistent with block 440. The determination may include comparing the process identifier and effective address fields in the translation request to the corresponding fields of each ERAT entry. If a matching ERAT entry is found, the method may determine whether the entry's translation is flagged for invalidation, consistent with block 445. A translation may be flagged for invalidation in response to an inchoate invalidation request corresponding to the translation. If the translation is not flagged for invalidation, the index of the matching ERAT entry may be stored in the tracking array element corresponding with the MAE that will service the request, consistent with block 450.

Block 455 indicates that the method may then update the indicator associated with the matching ERAT entry. As discussed previously, updating an entry's indicator may include incrementing (or decrementing) counter, or setting a valid bit in a tracking array. The method may then wait until the memory access have been serviced (the requested read or write operation has finished), consistent with block 460. Next, the method may update the matching ERAT entry's indicator a second time, consistent with block 465. The second update signifies that the associated translation entry is no longer being used in the requested memory access. The update may include performing an operation opposite of the operation executed in the update at block 455. For example, if the update executed at block 455 included incrementing a counter, the update at block 465 may include decrementing the same counter. Finally, the method may invalidate the index stored in the tracking array element associated with the MAE that executed memory access. The method can then end, as indicated in block 499.

The method steps illustrated in blocks 435-470, and discussed herein, reflect one possible sequence for tracking an address translation used in a single memory access request destined for a single MAE. According to various embodiments, the method steps may be executed in parallel for a plurality of memory access requests destined for a plurality of MAEs. For example, in a given time slice, the second indicator update shown in block 465 may be performed on the indicators associated with two different ERAT entries in response to two MAEs completing memory access requests. Concurrently, in the same time slice, a tracking array entry associated with a third MAE may be updated with the index of an ERAT entry being use to translate an address for third memory access, consistent with block 450.

The system and method shown in FIGS. 1-4 represent one possible embodiment of the present invention. According to various embodiments, the EMU may also be used in the Load Store Units (LSUs) of the processor cores 140 shown in FIG. 1. An EMU located in the LSUs may be used to translate instruction memory access requests triggered by cache misses. Multiple MAEs responsible for processing these instruction memory access requests may have operations pending when an invalidation request is received. The system and method described herein can be used to stall the invalidations until all memory access operations using the address targeted for invalidation have finished.

The flowchart and block diagrams in the figures illustrate the architecture, functionality, and operation of possible implementations of systems, and methods according to various embodiments of the present disclosure. It should be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and microcode instructions.

What is claimed is:

1. A method, implemented in a computing system having both a memory management unit with a translation lookaside buffer (TLB) and a central processing unit (CPU) with an effective address to real address translation (ERAT) unit having an ERAT table and corresponding set of counters, for tracking address translation entries in the ERAT table, the method comprising:

storing, by the ERAT unit, a set of effective address to real address translations in entries of the ERAT table, wherein the ERAT table includes an entry for each effective address to real address translation in the set of effective address to real address translations and the corresponding set of counters includes a counter corresponding to each ERAT entry;

receiving, by the ERAT unit, a request to execute a memory operation;

determining, by the ERAT unit, whether the request to execute a memory operation is one of a memory access request and an address invalidation request, wherein
the memory access request is received from an execution unit within the CPU to cause the ERAT unit to provide a first effective address to real address translation to a first memory access entity (MAE) of a set of two or more memory access entities (MAEs) in the CPU, the request including a first identifier of the first MAE, and
the address invalidation request is received from a memory management unit (MMU) external to the CPU to cause the ERAT unit to stop using a second effective address to real address translation stored in the ERAT table to translate effective addresses;

determining, in response to determining that the request to execute a memory operation is a memory access request, that the first effective address to real address translation is stored in the ERAT table in a first ERAT table entry having a first ERAT table index;

storing, by the ERAT unit, the first ERAT table index in a first tracking array entry of a tracking array having entries with indexes corresponding to each identifier of each MAE in the set of two or more MAEs, wherein the first tracking array entry has an index corresponding to the first identifier;

incrementing, by the ERAT unit, a first counter associated with the first ERAT table entry;

receiving, by the ERAT unit from a second MAE, an indication that the second MAE has completed a memory access using a third effective to real address translation, the indication including a second identifier of the second MAE;

retrieving, by the ERAT unit from the tracking array using the second identifier, a second ERAT table index corresponding to a second ERAT table entry providing the third effective to real address translation; and identifying, by the ERAT unit using the second ERAT table index, a second counter associated with the second ERAT table entry and decrementing the second counter.

2. The method of claim 1, further comprising:

identifying, in response to determining that the request to execute a memory operation is an address invalidation request and based on a first effective address and a first process identifier included in the address invalidation request, a third ERAT table entry having the second effective to real address translation;

determining, by the ERAT unit, that a third counter associated with the third ERAT table entry indicates that the second effective to real address translation is not being used by any of the set of two or more MAEs; and invalidating, by the ERAT unit, the second effective to real address translation in the ERAT table in response to determining that the second effective to real address translation is not being used by any of the set of two or more MAEs.

3. The method in claim 1, further comprising:

identifying, in response to determining that the request to execute a memory operation is an address invalidation request and based on a first effective address and a first process identifier included in the address invalidation request, a third ERAT table entry having the second effective to real address translation;

determining, by the ERAT unit, that a third counter associated with the third ERAT table entry indicates that the second effective to real address translation is being used by at least one MAE; and stalling, by the ERAT unit and in response to determining that the second effective to real address translation request is being used by at least one MAE, execution of the address invalidation request.

4. The method in claim 1, wherein the counter is a one-bit counter.

5. The method in claim 1, wherein the tracking array tracks translations used by an MAE in the set of two or more MAEs.

6. The method in claim 5, wherein the tracking array comprises a plurality of elements, each element associated with one of the set of two or more MAEs.

7. The method in claim 1, wherein the address invalidation request includes a request to invalidate a plurality of address translations.

* * * * *